United States Patent Office 3,507,153
Patented Apr. 21, 1970

3,507,153
TYMPANIC MEMBRANE THERMOMETER
Louis R. Jones, Huntingdon Valley, George C. Mergner, Glenside, and Will McAdam, Blue Bell, Pa., assignors to Leeds & Northrup Company, Philadelphia, Pa., a corporation of Pennsylvania
Filed July 12, 1968, Ser. No. 744,362
Int. Cl. G01k 1/16, 7/04
U.S. Cl. 73—359     7 Claims

ABSTRACT OF THE DISCLOSURE

A thermometer for measuring the temperature of the tympanic membrane in an ear canal. A thermoplastic tube has a heat sensor of small dimensions positioned at the distal end of the tube. A pair of flexible electrically insulated leadwires connected at one end to the heat sensor extends out through the tube. A soft fibrous material is securely held and covers the distal end of the tube and extends beyond the end to form a substantially continuous covering over and around the end of the tube and the heat sensing means to provide a protective covering between the tympanic membrane and the heat sensor.

BACKGROUND OF THE INVENTION

Clinical thermometers are utilized for measuring internal body temperatures for diagnostic and research purposes. One of the important uses of clinical thermometers is in clinical anesthesia. Thermometry in anesthesia is discussed in "Clinical Anesthesia," vol. 2, 1964, pp. 109–126. One of the forms of such thermometry advocated by Theodor H. Benzinger is a small thermocouple device for measuring the temperature of the tympanic membrane. A flexible thermoelectric probe is adapted to be inserted into the auditory canal until the temperature-sensitive end portion thereof contacts the tympanic membrane. The level of the electrical output signal developed by the probe is then recorded while maintaining contact with the tympanic membrane. Such device and method of use thereof is disclosed in Benzinger Patents Nos. 3,054,379 and 3,156,117.

The tympanic membrane is very sensitive to pressure and one of the problems with clinical ear thermometers has been to provide a device which would be comfortable for the individual while temperature measurements are being taken and at the same time insure that the temperature sensing device of the thermometer is in contact with or sufficiently close to the tympanic membrane so as to provide accurate temperature measurements.

It is an object of the present invention to provide a tympanic membrane thermometer utilizing a minimum amount of cotton or other similar cushioning material to protect the ear drum and to minimize the criticality of positioning for contact with the tympanic membrane while at the same time conducting heat from the membrane to the heat sensing means of the thermometer. It is a further object of the invention to provide a tympanic membrane thermometer which is constructed for ease of use and minimum discomfort of the patient while following temperature changes of the tympanic membrane with satisfactory speed and accuracy.

SUMMARY OF THE INVENTION

These and additional objects of the invention are accomplished by a thermometer device suited primarily for measuring the temperature of the tympanic membrane comprising an elongated support member having a heat sensing means of small dimensions positioned at the distal end of the support member and a pair of flexible electrically insulated lead-wires connected at one end to the heat sensing means and extending from the opposite end of the support member. Soft fibrous material is securely held and covers the distal end of the support member and extends beyond the end to form a substantially continuous covering over and around the end of the support member and the heat sensing means, and means for holding the heat sensing means at the distal end of the support member.

For a more detailed disclosure of the invention and for further objects and advantages thereof, reference is to be had to the following description taken in conjunction with the accompanying drawings.

DESCRIPTION OF THE PREFERRED EMBODIMENT

In making measurements of the temperature of the tympanic membrane, it has been found that a fine-gauge bare thermocouple formed into a small loop exhibits the best response characteristics. If cooper and constantan are the couple materials, a #40 B & S gauge copper wire and a #36 B & S gauge contantan wire will produce a millivoltage that is not detectably influenced by conduction losses where instruments with a sensitivity of one microvolt per division are used. Other thermocouple materials such as Chromel-constantan may also be used with the advantage of greater sensitivity and lower conduction losses at the expense of less accuracy. This invention is directed to a novel arrangement for using a minimum amount of soft cushioning material to protect the ear drum and to minimize the criticality of positioning the heat sensing means of the thermometer with respect to the tympanic membrane and at the same time to conduct heat from the membrane to the heat sensing means of the thermometer.

Figure 1:
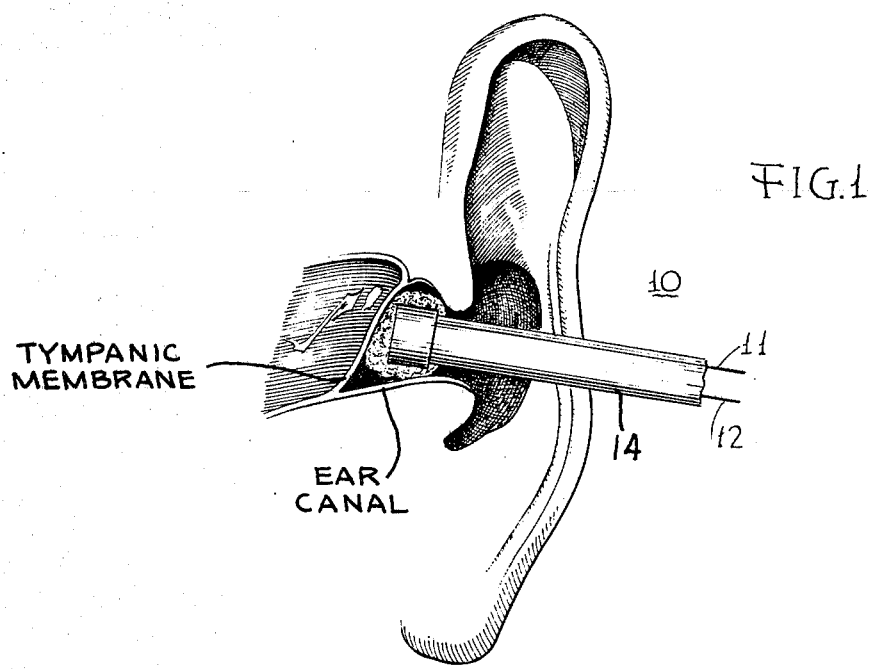
FIG. 1 illustrates the heat sensing means of a thermometer embodying the present invention positioned in the ear canal in contact with the tympanic membrane for a temperature measurement.
Figure 2:
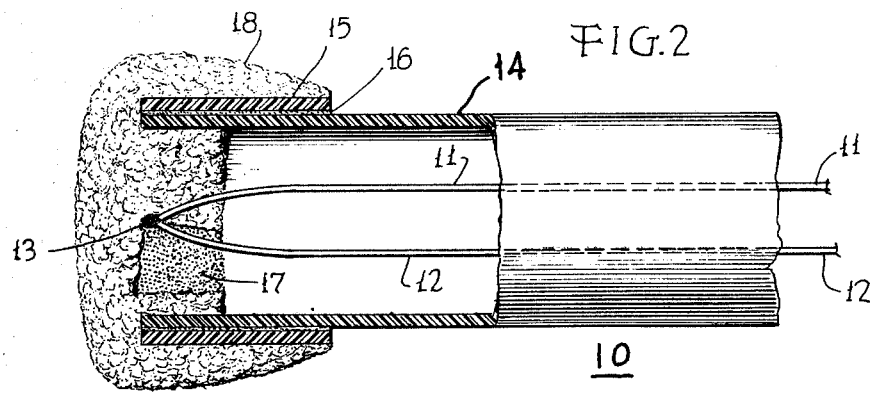
FIG. 2 is a partial sectional view on an enlarged scale of a thermometer constructed in accordance with the present invention.

Referring to FIGS. 1 and 2, there is illustrated a thermometer device 10 including a pair of fine gauge wires 11 and 12 such as copper and constantan respectively which have been joined together at one end 13 to form the thermoelectric junction of a thermocouple used as a heat sensing means. The thermocouple is desirably positioned within a flexible plastic tubing 14, such as polyethylene or the equivalent, with the junction 13 being positioned at the distal end of the tube 14. Absorbent cotton, facial tissue, or other equivalent soft fibrous material 18 is wound about and covers the distal end of the tube 14 and extends beyond the end to form a substantially continuous covering over and around the end of the tube 14 and the measuring junction 13 of the thermocouple. The cotton 18 is secured to the sides of the distal end of the tubing 14 so that it will not be dislodged when the thermometer 10 is placed in the ear canal with the cotton 18 against the tympanic membrane as shown in FIG. 1. The cotton 18 is preferably first secured to a short, structurally firm plastic tubing 15 having an inside diameter slightly greater than the outside diameter of the tubing 14 so as to fit in telescopic relation as shown in FIG. 2. The tube 15 preferably is secured to the inner tubing 14 by a rubber or latex type cement as at 16.

The junction 13 of the thermocouple preferably is held at the distal end of the tubing 14 by means of a thermally conductive cement 17 such as that known as Du Pont #4929 silver cement. An alternate arrangement is to melt a small portion of the end of the tubing 14 around the thermocouple so as to anchor it in place against the cotton 18 or support the thermocouple on a rod-like member. The outer plastic tube 15 and the cotton 18 may comprise the tip of an applicator or absorbent swab such as the type disclosed in H. P. Bloch et al.—3,179,108.

Figure 3:
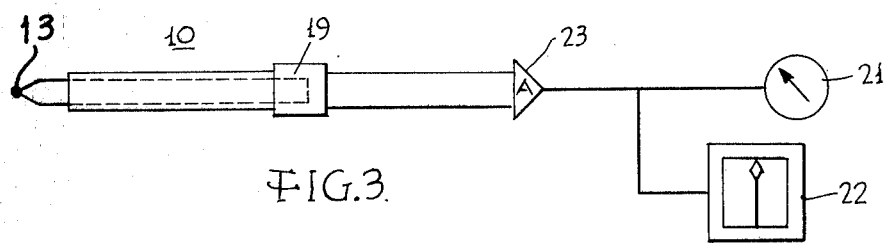
FIG. 3 is a simplified electrical circuit for providing a temperature indication utilizing the thermometer of FIGS. 1 and 2.

The electrically insulated lead wires 11 and 12 extend to the opposite end of the tubing 14 where they are adapted for connection to a suitable electrical connector element as shown in FIG. 3. The connector element may be of any well-known polarized type but should be of relatively light weight so as to avoid pulling the temperature sensing end of the thermometer out of the ear of the patient during the temperature measurement. The connector 19 is adapted to complete electrical connections from the thermometer device 10 to a measuring instrument. As shown in FIG. 3, the measuring instrument may take the form of an indicating meter 21 and/or a recorded 22 which are connected in circuit with a suitable amplifier 23 to which the thermometer device 10 is connected.

The thermometer device 10, as described above, may take several forms. Instead of utilizing a thermocouple with the measuring junction secured at the distal end of the tube 14, a fine coil of resistance wire may be positioned at such location within the tube or a thermistor may be substituted in place of the thermocouple.

It will be understood that the thermometer device, as shown in FIGS. 1–3, is illustrated on enlarged scale. The overall length of the tube 14 is not critical and may be of any suitable length for a particular application. In a specific embodiment, the tube 14 had a 0.062″ O.D. and a 0.045″ I.D. The soft material 18 was absorbent cotton and the tubing 15 comprised a tip from an absorbent cotton and the tubing 15 comprised a tip from an absorbent swab or applicator as mentioned above. The heat sensing device comprised a copper-constantan thermocouple of the type mentioned above. Such a construction has proved convenient to use with a minimum discomfort to the patient and when compared with other means of body temperature measurement has exhibited good response and with sensitivity.

While the preferred embodiment of the invention has been illustrated and described, it is to be understood that further modifications thereof may be made.

What is claimed is:

1. A thermometer device suited primarily for measuring the temperature of the tympanic membrane comprising:

an elongated support member, a heat sensing means of small dimensions positioned at the distal end of said support member, a pair of flexible electrically insulated leadwires connected at one end to said heat sensing means, and soft fibrous material securely held and covering said distal end of said support member and extending beyond said end and forming a substantially continuous covering over and around the end of said support member and said heat sensing means to protect the tympanic membrane and at the same time to conduct heat from the membrane to the heat sensing means.

2. A thermometer device according to claim 1 wherein said elongated support member comprises a flexible thermoplastic tube, said heat sensing means is positioned at the distal end of said tube, and said pair of leadwires connected at one end to said heat sensing means pass out through the other end of said tube.

3. A thermometer device according to claim 1 including means for holding said heat sensing means in contact with said material at said distal end of said support member.

4. A thermometer device according to claim 3 wherein said holding means for said heat sensing means comprises cement means contacting said fibrous material on the surface thereof adjacent said distal end of said support member.

5. A thermometer device according to claim 1 including a short section of structurally firm material secured at the distal end of said elongated support member, said fibrous material being wound tightly about said short section.

6. A thermometer device according to claim 5 wherein said elongated support member comprises a polyethylene tube, said short section comprises a structurally firm thermoplastic tube disposed in telescopic relation with the distal end of said polyethylene tube and said soft fibrous material comprises absorbent cotton wound tightly about said thermoplastic tube and covering said distal end of said polyethylene tube.

7. A thermometer device according to claim 1 wherein said soft fibrous material comprises absorbent cotton and said heat sensing means is in contact with said cotton.

References Cited

UNITED STATES PATENTS

| | | | |
|---|---|---|---|
| 490,679 | 1/1893 | Price | 128—409 |
| 1,942,516 | 1/1934 | Noyes | 73—359 XR |
| 3,156,117 | 11/1964 | Benzinger | 73—359 |

LOUIS R. PRINCE, Primary Examiner

F. SHOON, Assistant Examiner

U.S. Cl. X.R.

136—221, 229

PO-1050
(5/69)

UNITED STATES PATENT OFFICE
CERTIFICATE OF CORRECTION

Patent No. 3,507,153                    Dated April 21, 1970

Inventor(s) LOUIS R. JONES, GEORGE C. MERGNER AND WILL MCADAMS

It is certified that error appears in the above-identified patent and that said Letters Patent are hereby corrected as shown below:

Column 1, line 45, the patent number should read --3,054,397--.

Column 2, line 34, "cooper" should read --copper--;

line 36, "contantan" should read --constantan--.

Column 3, lines 43 and 44 "cotton and the tubing...absorbent"

(second occurrence) should be deleted.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents